(12) United States Patent
Todd

(10) Patent No.: US 11,891,566 B2
(45) Date of Patent: Feb. 6, 2024

(54) WEIGHTED FLUID LOSS CONTROL PILL FOR COMPLETION AND WORKOVER OPERATIONS

(71) Applicant: LYONDELLBASELL ADVANCED POLYMERS INC., Houston, TX (US)

(72) Inventor: Bradley L. Todd, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 73 days.

(21) Appl. No.: 16/934,494

(22) Filed: Jul. 21, 2020

(65) Prior Publication Data

US 2021/0032527 A1 Feb. 4, 2021

Related U.S. Application Data

(60) Provisional application No. 62/924,280, filed on Oct. 22, 2019, provisional application No. 62/882,214, filed on Aug. 2, 2019.

(51) Int. Cl.
| | |
|---|---|
| *E21B 33/138* | (2006.01) |
| *C09K 8/504* | (2006.01) |
| *C09K 8/514* | (2006.01) |
| *C04B 22/16* | (2006.01) |
| *C04B 26/28* | (2006.01) |
| *E21B 37/00* | (2006.01) |

(52) U.S. Cl.
CPC .............. *C09K 8/514* (2013.01); *C04B 22/16* (2013.01); *C04B 26/28* (2013.01); *C09K 8/5045* (2013.01); *E21B 33/138* (2013.01); *E21B 37/00* (2013.01)

(58) Field of Classification Search
CPC ...... C09K 8/514; C09K 8/5045; C09K 8/516; C09K 2208/10; C09K 2208/18; C04B 26/28; C04B 22/16; E21B 33/138; E21B 37/00

See application file for complete search history.

(56) References Cited

U.S. PATENT DOCUMENTS

| | | | | |
|---|---|---|---|---|
| 3,021,901 A | * | 2/1962 | Earlougher | C09K 8/528 166/275 |
| 3,516,469 A | * | 6/1970 | McDonald | E06B 9/08 160/133 |
| 3,516,496 A | * | 6/1970 | Jorda | C09K 8/516 166/295 |
| 3,612,182 A | * | 10/1971 | Raifsnider | C09K 8/74 166/270.1 |
| 3,688,844 A | * | 9/1972 | Roszelle | C09K 8/584 166/270.1 |
| 5,629,271 A | | 5/1997 | Dobson, Jr. et al. | |
| 6,242,390 B1 | * | 6/2001 | Mitchell | C09K 8/685 166/308.5 |
| 7,036,588 B2 | | 5/2006 | Munoz, Jr. et al. | |
| 2005/0003968 A1 | * | 1/2005 | Simonides | C09K 8/08 507/110 |
| 2009/0008095 A1 | * | 1/2009 | Duncum | C09K 8/502 166/276 |
| 2009/0025932 A1 | * | 1/2009 | Panga | C09K 8/80 166/278 |
| 2010/0319915 A1 | * | 12/2010 | Bustos | C09K 8/516 166/305.1 |
| 2016/0069155 A1 | | 3/2016 | Todd et al. | |
| 2018/0100375 A1 | | 4/2018 | Todd et al. | |

FOREIGN PATENT DOCUMENTS

| | | | | |
|---|---|---|---|---|
| CA | 2218205 A1 | * | 6/1998 | .............. C09K 7/02 |
| CN | 108251096 A | * | 7/2018 | .............. C09K 8/68 |
| CN | 105238370 B | | 10/2018 | |
| WO | WO-2004037946 A1 | * | 5/2004 | .............. C09K 8/03 |
| WO | 2007088322 A1 | | 8/2007 | |
| WO | WO-2013085767 A1 | * | 6/2013 | .............. C09K 8/62 |

OTHER PUBLICATIONS

Translation of CN-108251096-A (Year: 2018).*
International Search Report and Written Opinion dated Oct. 14, 2020 (dated Oct. 14, 2020) for Corresponding PCT/US2020/042881.
Wang et al., Effect of Sodium Trimetaphosphate on Chitosan-Methylcellulose Composite Films: Physicochemical Properties and Food Packaging Application, Polymers, 11(2), 368, 2019. <https://doi.org/10.3390/polym11020368>.
Gaixian Li, Introduction of Inorganic Chemistry, p. 159, Mar. 2005, China Petrochemical Press, Beijing.
Jianguang Wen, Purified Alkaline and Costic Alkaline, pp. 38-39, May 1998, Chemical Industry Press Publication, Beijing.
Langdao edit; Statistic Physics, pp. 353-355, Jul. 1964, People Education Press Publication, Beijing.

* cited by examiner

*Primary Examiner* — Angela M DiTrani Leff

(57) ABSTRACT

Novel completion fluid compositions for fluid loss control during completion and workover operations conducted on a wellbore penetrating a subterranean formation are disclosed. In particular, the composition is a weighted brine fluid having a polymetaphosphate composition, a biopolymer suspension agent, and a fluid loss control additive. These novel compositions provide a means to temporarily seal a wellbore communicating with a subterranean formation to enable completion or workover operations to be performed, after which the composition can be removed by contact with an acidic composition.

7 Claims, 1 Drawing Sheet

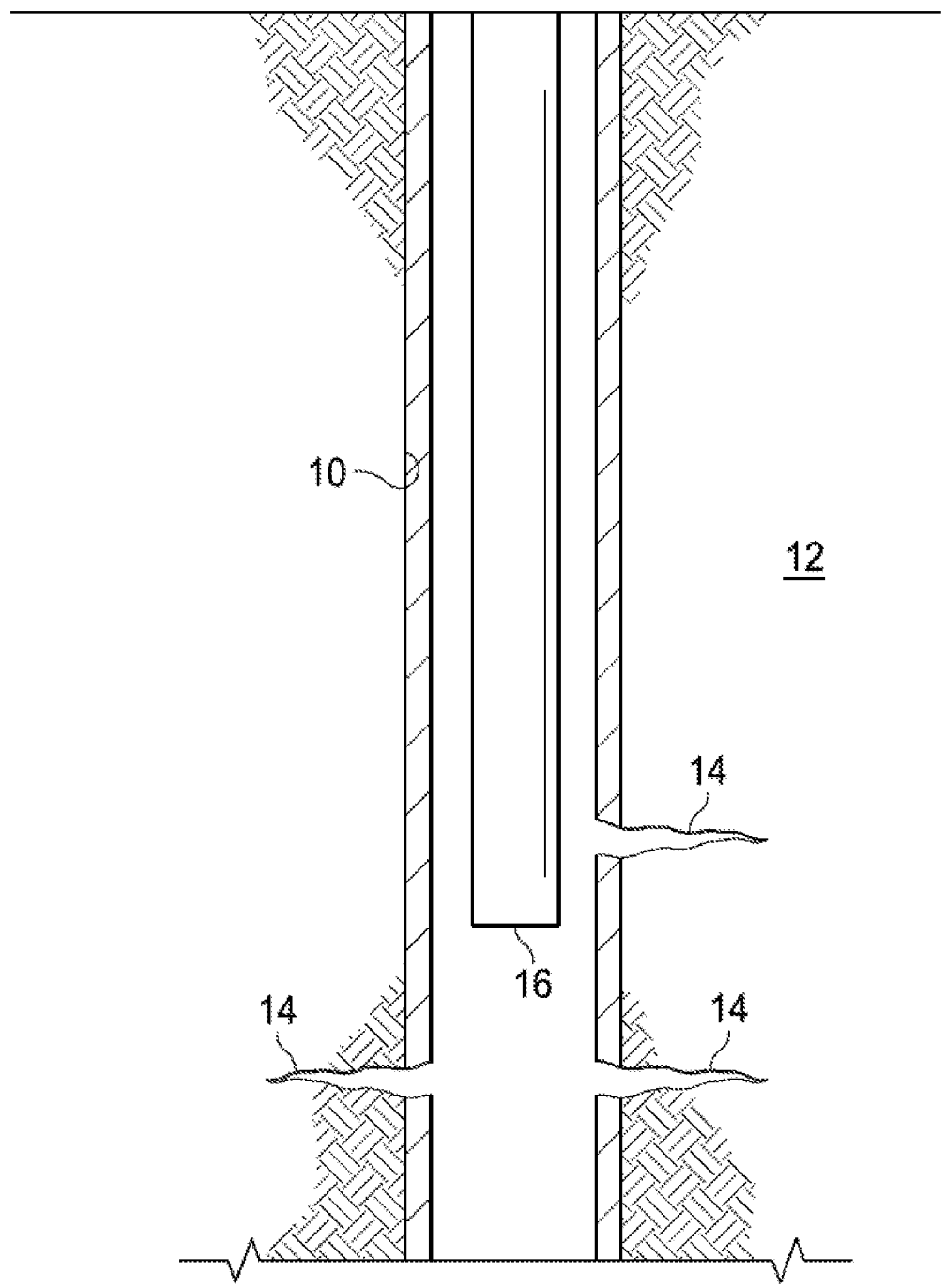

WEIGHTED FLUID LOSS CONTROL PILL FOR COMPLETION AND WORKOVER OPERATIONS

PRIOR RELATED APPLICATIONS

This application is the Non-Provisional Patent Application, which claims benefit of priority to U.S. Provisional Application No. 62/882,214, filed Aug. 2, 2019 and U.S. Provisional Application No. 62/924,280, filed on Oct. 22, 2019, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure generally relates to completion fluids and methods of use in hydrocarbon reservoirs, and more particularly to the use of readily removable additives in completion fluids.

BACKGROUND OF THE DISCLOSURE

Oil and gas companies are challenged to produce as much of their hydrocarbon reserves as possible in an efficient and cost-effective manner. As such, the completion and production process rely on the use of treatment fluids designed to resolve specific reservoir conditions through the use of one or more additives to increase hydrocarbon production. Unfortunately, these treatment fluids are lost to the formation, reducing the efficiency of the treatment.

During the completion phase, for example, weighted completion fluids are used to prevent blowouts during completion procedures and well workovers. When injected, the hydrostatic head of the weighted completion fluid within the wellbore exerts a greater pressure on the subterranean formation than the fluid pressures within the formation. This positive pressure towards the subterranean formation, while permitting control of the wellbore, causes the completion fluid to flow into vugs, pore spaces, and natural or manmade fractures in the formations, as well as other flow paths such as wellbore.

The loss of these weighted completion fluids is highly undesirable because completion fluids are very expensive. If high losses are experienced, the reservoir can become too cost inefficient to produce hydrocarbons. Additionally, the weighted completion fluids must be relatively viscous to suspend weighting materials included therein. When these viscous fluids are lost into formations containing hydrocarbons, the permeabilities of the formations are reduced, which in turn reduces the ability to produce hydrocarbons from the formations.

As such, one or more fluid loss control agents, in the form of gels or particulate matter, are included in the weighted completion fluid. Particulate material has been employed to temporarily bridge/seal/plug certain flow paths in the formations, such that these flow paths can be re-opened for subsequent operations. Similarly, gel fluid loss additives, or gel "pills", made from various natural polymers such as guar gum, hydroxyethylcellulose and their derivatives, have been used to control fluid loss by sealing openings. The pills are then removed by internal or external gel breaking chemicals to allow for production of hydrocarbon fluids from the formation.

There is a risk, however, of forming impenetrable plugs of fluid loss control agents in the perforations that cannot subsequently be removed. Soluble solid particulates bridge on a formation face and fill the perforations or fractures extending from within the wellbore into the formation. Though these particulates block openings to prevent fluid loss, circulated solvents that target the soluble particulates for removal will have limited contact with the particulates in the formation. As these solvents cannot penetrate the perforations or fractures, they cannot remove the particulates from the formation, resulting in an impenetrable plug extending from the wellbore into the perforations. This can stop or drastically reduce hydrocarbon production from the formation, and require costly reperforation and other remedial procedures to reopen the fractures.

Thus, there is a need for the development of improved compositions that can block openings of various sizes to prevent fluid loss, but are easily removed from all openings, including perforations extending from the wellbore. Ideally, these compositions are capable of being used with weighted fluids and do not affect the permeability of the reservoir.

SUMMARY OF THE DISCLOSURE

Described herein are compositions of treatment fluids and methods of their use in hydrocarbon reservoirs. Particularly, the compositions are weighted completion fluids comprising a polymetaphosphate composition, a biopolymer suspension agent, and a fluid loss control additive. The polymetaphosphate and fluid loss control additive temporarily block openings such as those in a wellbore communicating with a subterranean formation, or gravel pack screens, to enable completion or workover operations to be performed. Thereafter, the polymetaphosphate and fluid loss control additive can be removed by dissolution after a few minutes of contact with an acidic fluid circulated through the wellbore. This allows for quick removal compared to other fluid loss pills and additives that require six or more hours of soaking in acidic solutions.

Additionally, the treatment fluids disclosed herein can contain optional additives that are used in completion fluids but are not acidic. These optional additives include, but are not limited to salts, pH control additives, surfactants, breakers, biocides, additional fluid loss control agents, stabilizers, chelating agents, scale inhibitors, gases, mutual solvents, particulates, binders, proppants, corrosion inhibitors, oxidizers, reducers, and any combination thereof. As long as these optional additives do not lower the pH of the completion fluid below 4, the optional additives will not affect the ability of the polymetaphosphate composition and fluid loss control additive to form a physical barrier. This allows the presently disclosed compositions to be utilized in a variety of applications, in both reservoir and wellbore operations.

The present compositions and methods include any of the following embodiments in any combination(s) of one or more thereof:

A treatment fluid comprising a weighted brine, a biopolymer suspension agent for increasing the viscosity of the weighted brine to form a carrier fluid, a polymetaphosphate composition, and a fluid loss control additive. In an embodiment, an initial viscosity is that of fresh water at standard conditions (1 centipoise). In an embodiment, salt is added and the viscosity may increase between one or two centipoise for salts like sodium chloride. In other embodiments, the viscosity may be further increased by 3, 4, 5, 6, 7, 8, or 9 centipoise when for example saturated solutions of calcium chlorides are used. In still further embodiments, polymers (guar, xanthan, hydroxyethylcellulose, and the like) may be added, depending on the concentration, in order to increase the viscosity in the range of from 10 to 100 centipoise. In still alternatively and further embodiments, crosslinked polymers (such as guar, crosslinked with boron) may be used to increase the viscosity to 100 to 1000 centipoise.

A method of plugging an opening in a reservoir comprising injecting a treatment fluid into a subterranean formation, wherein the treatment fluid comprises a weighted brine carrier fluid, a biopolymer suspension agent for increasing the viscosity of the weighted brine carrier fluid, a particulate polymetaphosphate composition, and a fluid loss control additive. At least one opening in the subterranean formation is plugged with the particulate polymetaphosphate composition. The fluid loss control agent then plugs at least one gap between the particles of the particulate polymetaphosphate composition or a gap between the particulate polymetaphosphate composition and the opening. Once the openings are plugged and sealed, one or more additional operations that use a fluid in the subterranean formation can be performed, wherein the fluid is not lost through the plugged openings. Once the operations are completed, the openings can be unplugged by circulating an aqueous acidic fluid through the wellbore to remove the particulate polymetaphosphate composition and the fluid loss control additive. Fluids can then flow through the now un-plugged openings. The openings can be perforations, fractures, vugs, or pore spaces in the reservoir, including the wellbore, or openings in screens such as gravel pack screens, A method of plugging a gravel pack screen in a reservoir comprising injecting a treatment fluid into a subterranean formation having at least one gravel pack screen, wherein the treatment fluid comprises a weighted brine carrier fluid, a biopolymer suspension agent for increasing the viscosity of the weighted brine carrier fluid, a particulate polymetaphosphate composition, and a fluid loss control additive. At least one opening in the gravel pack screen is plugged with the particulate polymetaphosphate composition. The fluid loss control agent then plugs at least one gap between the particles of the particulate polymetaphosphate composition or a gap between the particulate polymetaphosphate composition and the gravel pack screen with the fluid loss control additive. Once the openings are plugged and sealed, one or more additional operations using a fluid in the subterranean formation can be performed, wherein the fluid is not lost through the plugged openings of the gravel pack screen. Once the operations are completed, the openings can be unplugged by circulating an aqueous acidic fluid through the wellbore to selectively remove the particulate polymetaphosphate composition and the fluid loss control additive. Fluids can then flow through the now un-plugged openings in the gravel pack screen.

Any of the above, wherein the weighted brine carrier fluid comprises an aqueous fluid and a salt selected from the group consisting of calcium chloride, calcium bromide, zinc bromide, sodium chloride, sodium bromide, potassium chloride, ammonium chloride, cesium formate, or combinations thereof.

Any of the above, wherein the biopolymer suspension agent is xanthan, cellulose derivatives, guar derivatives, diutan, or combinations thereof.

Any of the above, wherein the particulate polymetaphosphate composition has the chemical formula of $M_XP_XO_{3X}$, $M''_X(P_XO_{3X})_2$, $(M_ZM'_{(1-Z)}PO_3)_n$, or $(M_ZM''_{(1-Z/2)}PO_3)_n$, wherein M and M' are selected from Li, Na, K, Rb, Cs or combinations thereof, M'' is selected from Be, Mg, Ca, Sr, Ba, Zn, Pb, Cu, Ni, or combinations thereof; X is an integer; Z is 1, ⅔, ½, or ⅓; and, n is an integer from 1 to 100, or greater.

Any of the above, wherein the particulate polymetaphosphate composition is selected from a group comprising sodium polymetaphosphate $((NaPO_3)_6)$, sodium trimetaphosphate $((NaPO_3)_3)$, potassium polymetaphosphate $((KPO_3)_6)$, potassium trimetaphosphate $((KPO_3)_3)$, magnesium polymetaphosphate $(Mg(PO_3)_2)$, calcium polymetaphosphate $(Ca(PO_3)_2)$, and combinations thereof.

Any of the above, wherein the particulate polymetaphosphate composition has the general formula of:

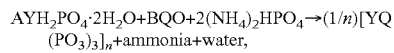

$$AYH_2PO_4 \cdot 2H_2O + BQO + 2(NH_4)_2HPO_4 \rightarrow (1/n)[YQ(PO_3)_3]_n + \text{ammonia} + \text{water},$$

wherein A and B are numbers of moles of reactants and the ratio of A:B is in the range of from about 1:1 to about 6:1, Y is selected from Li, Na, K, Rb, Cs, or combinations thereof, Q is selected from Be, Mg, Ca, Sr, Ba, Zn, Pb, Cu, Ni, or combinations thereof; and, n is from about 1 to about 100 or greater. In various embodiments herein, the general formula of the particulate polymetaphosphate composition indicates a polymetric formula.

Any of the above, wherein the particulate polymetaphosphate composition has the formula of:

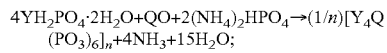

$$4YH_2PO_4 \cdot 2H_2O + QO + 2(NH_4)_2HPO_4 \rightarrow (1/n)[Y_4Q(PO_3)_6]_n + 4NH_3 + 15H_2O;$$

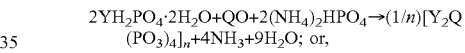

$$2YH_2PO_4 \cdot 2H_2O + QO + 2(NH_4)_2HPO_4 \rightarrow (1/n)[Y_2Q(PO_3)_4]_n + 4NH_3 + 9H_2O; \text{ or,}$$

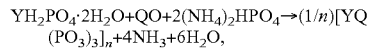

$$YH_2PO_4 \cdot 2H_2O + QO + 2(NH_4)_2HPO_4 \rightarrow (1/n)[YQ(PO_3)_3]_n + 4NH_3 + 6H_2O,$$

wherein A and B are numbers of moles of reactants and the ratio of A:B is in the range of from about 1:1 to about 6:1, Y is selected from Li, Na, K, Rb, Cs, or combinations thereof, Q is selected from Be, Mg, Ca, Sr, Ba, Zn, Pb, Cu, Ni, or combinations thereof; and, n is from about 1 to about 100, or greater.

Any of the above, wherein the particulate polymetaphosphate composition has a particle size between about 1 to about 1200 microns.

Any of the above, wherein the particulate polymetaphosphate composition has a particle size between about 1 to about 90 microns for plugging an opening in a formation rock and/or wellbore.

Any of the above, wherein the particulate polymetaphosphate composition has a particle size between about 200 to 600 microns for plugging an opening in a gravel screen pack.

Any of the above, wherein the fluid loss control additive is selected from a group comprising starch, ground guar, soft wax, oil soluble resin or combinations thereof.

Any of the above, wherein the weighted brine carrier fluid in the treatment fluid is weighted by a salt selected from the group consisting of calcium chloride, calcium bromide, zinc bromide, sodium chloride, sodium bromide, potassium chloride, ammonium chloride, cesium formate, or combinations thereof; wherein the biopolymer suspension agent fluid in the treatment fluid is present in an amount between 10 to about 120 pounds per 1000 gallons of the carrier fluid; wherein the particulate polymetaphosphate composition fluid in the treatment fluid is present in an amount of about 10 to about 200 pounds per barrel of the carrier liquid, wherein the particulate polymetaphosphate composition has a particle size between about 1 to about 1200 microns or from about 1 to 90 microns or from about 200 to 600 microns; and wherein the fluid loss control additive is present in an amount of about 1 to about 20 pounds per barrel of the carrier fluid.

Any of the above treatment fluids further comprising at least one additional additive selected from a group comprising salts, pH control additives, surfactants, breakers, biocides, additional fluid loss control agents, stabilizers, chelating agents, scale inhibitors, gases, mutual solvents, particulates, binders, proppants, corrosion inhibitors, oxidizers, reducers, and any combination thereof, wherein the at least one additional additive does not now the pH of the treatment fluid.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

Definitions

As used herein, the term "treatment," or "treating," is intended to refer to any wellbore or subterranean operation that uses a fluid in conjunction with a desired function and/or for a desired purpose. The term "treatment," or "treating," is not intended to imply any particular action by the fluid. A "completion fluid" is a type of treatment fluid used during the completion of an oil or gas well, and is used to minimize formation damage and to control formation pressure.

As used herein, the term "fluid loss" refers to the undesirable migration or loss of fluids into a subterranean formation and/or a proppant pack.

The term "polymetaphosphate" refers to a class of cyclic condensed phosphate-based compounds formed by each phosphate ($PO_4$) unit sharing two corners (i.e. oxygens) with another phosphate unit. Polymetaphosphates are glassy solids that are insoluble or slowly degradable in water and aqueous fluids, but dissolve readily in acidic fluids with a pH of 4 or less.

All concentrations herein are by weight percent ("wt %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| pptg | pounds per thousand gallons |
| ppg | pounds per gallons |

BRIEF DESCRIPTION OF THE DRAWINGS

The FIGURE displays one embodiment of the presently disclosed methods.

DESCRIPTION OF EMBODIMENTS OF THE DISCLOSURE

The presently disclosure provides novel compositions for wellbore completion and workover operations, particularly for wellbores penetrating a subterranean formation. The novel treatment fluid composition utilizes a polymetaphosphate and a fluid loss control additive to temporarily seal an opening in a wellbore communicating with a subterranean formation to enable completion or workover operations to be performed. The polymetaphosphate fills the opening and/or provides a bridge on the face of the opening, and the fluid loss control additive provides a bridge onto the polymetaphosphate composition thus sealing the opening. Once the completion or workover operations are finished, the polymetaphosphate can be removed by contact with an acidic composition, thus allowing fluid flow. Methods of using the novel composition are also described.

In more detail, the novel completion fluid is a weighted degradable composition that has a particulate polymetaphosphate composition, a biopolymer suspension agent, a fluid loss control additive, and a weighted brine.

The base of the novel completion fluid is a weighted brine made viscous by the addition of a biopolymer suspension agent. Completion fluids have to be weighted so the hydrostatic head of the weighted completion fluid within a wellbore exerts a greater pressure on the subterranean formation than the fluid pressures within the formation. The novel completion fluid disclosed herein can include a weighted fluid formed by adding any weighting additive used in completions fluids, including but not limited to, calcium chloride, calcium bromide, zinc bromide, sodium chloride, sodium bromide, potassium chloride, ammonium chloride, and cesium formate to an aqueous solution.

A biopolymer suspension agent is then added to the weighted brine to increase the viscosity of the brine, thus creating the carrier fluid for the completion fluid. The novel completion fluid disclosed herein includes any biopolymer suspension agent used in completions fluids, such as xanthan, cellulose derivatives, guar derivatives, diutan, or combinations thereof. The choice of biopolymer suspension agent will depend on the downhole conditions. For example, a biopolymer suspension agent that is stable at extreme temperatures is needed to increase the viscosity of the completion fluid being injected into high temperature reservoirs. Diutan, which is a high molecular weight gum with good rheological properties, is stable at higher temperatures. In contrast, xanthan has properties that are more conducive to low to mid-temperature reservoirs.

The biopolymer suspension agent is present in an amount in the range of from about 10 to about 120 pounds per 1000 gallons of carrier fluid, or an amount in the range of from about 20 to 60 pounds per 1000 gallons of carrier fluid. In some embodiments, the amount of the biopolymer suspension agent is between about 10 to about 50 pounds per 1000 gallons of carrier fluid, or between about 80 to about 120 pounds per 1000 gallons of carrier fluid, or between about 60 to about 80 pounds per 1000 gallons of carrier fluid.

Once the carrier fluid has the right viscosity and weight, the fluid loss control agents can be added. At least two types of fluid loss control agents are used: a larger material to plug or bridge the face of the opening, and a smaller material to bridge the gaps between particulates of the larger material or the gaps between the larger material and the edges of the opening.

The predominant fluid loss control agent in the present completions fluids is a particulate polymetaphosphate composition that is large enough to bridge the face of the opening or plug the openings. Polymetaphosphates are a class of compounds formed by the cyclic condensation of three or more phosphate groups. Each phosphate unit in the compound shares two corners with another phosphate unit. The resulting particulate is a glass solid that is poorly soluble in water but readily dissolves in acid.

The completion fluids can utilize particulate polymetaphosphate compositions that have chemical formulas selected from a group consisting of $M_XP_XO_{3X}$, $M''_X(P_XO_{3X})_2$, $(M_ZM'_{(1-Z)}PO_3)_n$, or $(M_ZM''_{(1-Z/2)}PO_3)_n$, wherein M and M' are selected from Li, Na, K, Rb, Cs, or combinations thereof, M'' is selected from Be, Mg, Ca, Sr, Ba, Zn, Pb, Cu, Ni, or combinations thereof; X is an integer; Z is 1, ⅔, ½, or ⅓; and, n is from about 1 to about 100 or greater.

Exemplary particulate polymetaphosphate compositions for use in the present fluids includes sodium polymetaphosphate $((NaP_3)_6)$, sodium trimetaphosphate $((NaPO_3)_3)$, potassium polymetaphosphate $((KPO_3)_6)$, potassium trimetaphosphate $((KPO_3)_3)$, magnesium polymetaphosphate $(Mg(PO_3)_2)$, calcium polymetaphosphate $(Ca(PO_3)_2)$, Slow Phos® (Pacific Standard Specialties, Mesa, AZ), Poly-Phos® (SPER Chemical Company, Clearwater, FL), and combinations thereof.

Additional polymetaphosphates compositions are described in US20160069155, which is incorporated herein in its entirety for all purposes. US20160069155 teaches the use of polymetaphosphates compositions for forming solid masses such as tools or spherical shapes, which are then coated to prevent hydration of the polymetaphosphates compositions. The present methods utilize polymetaphosphates compositions with addition fluid loss control agents to fill gaps between the polymetaphosphates particles as well as weighting chemicals to move the fluid loss control agents through the reservoir.

The polymetaphosphate compositions in US20160069155 are formed by the following chemical reaction of:

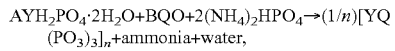
$AYH_2PO_4 \cdot 2H_2O + BQO + 2(NH_4)_2HPO_4 \rightarrow (1/n)[YQ(PO_3)_3]_n + \text{ammonia+water}$, wherein A and B are numbers of moles of reactants and the ratio of A:B is in the range of from about 1:1 to about 6:1. Exemplary chemical reactions include:

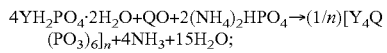
$4YH_2PO_4 \cdot 2H_2O + QO + 2(NH_4)_2HPO_4 \rightarrow (1/n)[Y_4Q(PO_3)_6]_n + 4NH_3 + 15H_2O$;

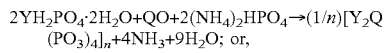
$2YH_2PO_4 \cdot 2H_2O + QO + 2(NH_4)_2HPO_4 \rightarrow (1/n)[Y_2Q(PO_3)_4]_n + 4NH_3 + 9H_2O$; or,

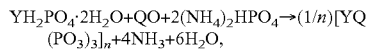
$YH_2PO_4 \cdot 2H_2O + QO + 2(NH_4)_2HPO_4 \rightarrow (1/n)[YQ(PO_3)_3]_n + 4NH_3 + 6H_2O$, wherein A and B are numbers of moles of reactants and the ratio of A:B is in the range of from about 1:1 to about 6:1, Y is selected from Li, Na, K, Rb, Cs, or combinations thereof, Q is selected from Be, Mg, Ca, Sr, Ba, Zn, Pb, Cu, Ni, or combinations thereof, and, n is from about 1 to about 100 or greater. The following article provides a description of polymetaphosphate compositions and along with their synthesis and characterization, Mehrotra, Ram C. "Synthesis and properties of simple and complex polymetaphosphate glasses of alkali metals." Pure and Applied Chemistry 44 (1975): 201-220, the contents of which are incorporated herein by reference in its entirety.

As described in US20160069155, particulate polymetaphosphate compositions may be formulated to have a pre-determined solubility in the formation or carrier fluid. This enables the composition to be substantially insoluble for a period of time and then experience controlled degradation in the subterranean formation, wherein it is slowly degradable in aqueous fluid present in the formation under the conditions existing in the subterranean formation. Thus, the operator can controllably block certain porous rock or other areas in a reservoir for a temporary period of time, without having to worry about permanent blockage.

Though dissolvable, the particulate material is substantially a polymetaphosphate composition that should be insoluble in and suspended by the carrier fluid. For the present fluids and methods, the weighted brine carrier fluid allows the particulate polymetaphosphate composition to remain substantially insoluble in the formation until the carrier fluid is removed, by e.g. circulation of an aqueous fluid within the wellbore or the introduction of an aqueous acidic solution. After the carrier fluid is removed, the particulate polymetaphosphate composition can rapidly be dissolved. This results in the fluid loss to the formation to greatly increase, assisting in the removal of any remaining composition constituents in the perforation or formation.

The particulate polymetaphosphate composition has a particle size that is selected such that it plugs or bridges on the face of the opening and/or fill the perforation or opening. Thus, the particulate polymetaphosphate composition has a particle size in the range of from about 1 to about 1200 microns. In some embodiments, the particle size in the range of from about 1 to about 90 microns, when the surface to be bridged is a formation face. In other embodiments, the particle size in the range of from about 10 to about 600 microns when the surface being bridged is a gravel pack screen. Alternatively, the particle size is between about 1 micron to 130 microns, or between about 750 microns to about 1200 microns, or between about 200 microns to about 600 microns.

Further, the particulate polymetaphosphate composition is present in the carrier fluid in an amount of from about 10 to about 200 pounds per barrel of the carrier fluid. Alternatively, the particulate polymetaphosphate composition is present in an amount between about 10 and 75 pounds per barrel of the carrier liquid, or between about 125 and 200 pounds per barrel of the carrier liquid, or between about 75 and 125 pounds per barrel of the carrier liquid.

A second, smaller particulate material can be added to the novel completion fluid as a fluid loss control additive. The smaller additional fluid loss control material has a particle size selected such that it bridges on the larger polymetaphosphate particulates and forms a seal thereover.

Any fluid loss control additive typically used in completions fluids can be used as the second particulate material. Examples of such additional fluid loss control agents include, but are not limited to, starches polylactic acid, polyglycolic acid, other aliphatic esters, silica flour, gas bubbles (energized fluid or foam), benzoic acid, soaps, resin particulates, relative permeability modifiers, and other immiscible fluids. In some embodiments, the fluid control additive is selected from a group comprising starch, ground guar, soft wax, oil soluble resin or the like.

The second particulate solid material have a median particle size which is about ⅓ the median size of the openings between the particulate polymetaphosphate composition to bridge thereon. Ranges of particle sizes for the second particulate solid material is between about 0.01 to about 100 microns or between about 3 and 100 microns. In some embodiments, the additional fluid loss control material is present in the range of from about 1 to about 20 pounds per barrel of the carrier fluid.

After mixing the fluid loss control agents into the viscous, weighted brine, the novel completion fluid can be injected into a reservoir to temporarily seal a wellbore communicating with a subterranean formation to enable completion or workover operations to be performed. Once the fluid loss control capabilities are not needed, the composition can be removed by contact with an acidic composition circulating through the wellbore.

Depending on the application of the completion fluid, additional additives that do not lower the pH of the fluid can be included in the carrier fluid to address other needs of the reservoir or wellbore without affecting the ability of the polymetaphosphate composition and fluid loss control additive to form a physical barrier. Thus, the completion fluids can further comprise optional additive including, but not limited to salts, pH control additives, surfactants, breakers, biocides, additional fluid loss control agents, stabilizers, chelating agents, scale inhibitors, gases, mutual solvents, particulates, corrosion inhibitors, oxidizers, reducers, and any combination thereof. In some embodiments, the additives are added after the openings have been blocked by the polymetaphosphate composition and fluid loss control additive.

In more detail, the novel completion fluid compositions can be combined with optional additives such as:

Particulates

The novel completion fluids described herein may further comprise additional optional particulates, including proppant particulates or gravel particulates. Such particulates may be included in the completion fluids when, for example, a gravel pack is to be formed in at least a portion of the wellbore, or a proppant pack is to be formed in one or more fractures in the subterranean formation.

Particulates for use in the presently described completion fluids and methods may comprise any material used in subterranean operations, including but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Exemplary composite particulates may comprise a binder and a filler material wherein the filler materials include silica, alumina, fumed carbon, carbon black, graphite, mica, titanium dioxide, calcium silicate, kaolin, talc, zirconia, boron, fly ash, hollow glass microspheres, solid glass, and combinations thereof.

The additional particulates described here are not limited to a particular shape. All shapes of materials, including spherical materials, fibrous materials, polygonal materials (such as cubic materials), and mixtures thereof can be used according to the application. For example, fibrous materials may or may not be used to bear the pressure of a closed fracture during a fracturing operation, but could be included in the fluid loss control operations. In some embodiments, the particulates may be coated with any suitable resin or tackifying agent known to those of ordinary skill in the art.

The mean particulate size for these additional particulates may range from about 2 mesh to about 400 mesh on the U.S. Sieve Series Scale. However, in certain circumstances, other mean particulate sizes may be desired and will be entirely suitable for practice of the presently described methods. In some embodiments, the mean particulate size distribution ranges are one or more of 6/12, 8/16, 12/20, 16/30, 20/40, 30/50, 40/60, 40/70, 50/70, or 70/140 mesh, or down to smaller sizes of 200 mesh and 10's of microns. The additional particulates may be present in the completion fluids in the range of from about 0.5 pounds per gallon ("ppg") to about 30 ppg by volume of the completion fluid.

pH Control

A pH control additive may be necessary to maintain the pH of the completion fluid at a desired level to improve the effectiveness of certain breakers or crosslinkers. One of ordinary skill in the art will be able to select a pH for a particular application.

Surfactants

In some embodiments, the completion fluids of the present disclosure may include optional surfactants to improve the compatibility of the completion fluids with other fluids (like any formation fluids) that may be present in the wellbore. One of ordinary skill in the art will be able to identify the type of surfactant as well as the appropriate concentration of surfactant to be used.

Surfactants may be used in a liquid or powder form. Where used, the surfactants may be present in the completion fluid in an amount sufficient to prevent incompatibility with formation fluids, other completion fluids, or wellbore fluids. In an embodiment where liquid surfactants are used, the surfactants are present in the range of from about 0.01% to about 5.0% by volume of the completion fluid. In other embodiments, the liquid surfactants are present in the range of from about 0.1% to about 2.0% by volume of the completion fluid. In other embodiments, the liquid surfactants are present in the range of from great than 0 to about 10 pptg of the carrier fluid, or about 2 to about 7 pptg of the carrier fluid or 1 pptg of the carrier fluid. In embodiments where powdered surfactants are used, the surfactants may be present in the range of from about 0.001% to about 0.5% by weight of the completion fluid.

In those embodiments where it is desirable to foam the completion fluids of the present disclosure, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the completion fluids include, but are not limited to, betaines, amine oxides, methyl ester sulfonates, alkylamidobetaines such as cocoamidopropyl betaine, alpha-olefin sulfonate, trimethyl tallow ammonium chloride, C8 to C22 alkylethoxylate sulfate and trimethyl coco ammonium chloride. Other foaming agents and foam stabilizing agents may be included as well, which will be known to those skilled in the art.

Breakers

In some embodiments of the present disclosure, the completion fluids may comprise breakers.

Examples of breakers for use in the described completion fluids include, but are not limited to, sodium chlorites, hypochlorites, perborate, persulfates, and peroxides (including organic peroxides). Other breakers include, but are not limited to, acids and peroxide breakers, delinkers, as well as enzymes that may be effective in breaking viscosified completion fluids. In some embodiments, the breaker may be citric acid, tetrasodium EDTA, ammonium persulfate, or cellulose enzymes.

A breaker may be included in an amount and form sufficient to achieve the desired viscosity reduction at a desired time. The breaker may be formulated to provide a delayed break or may be encapsulated. Encapsulation methods are known by those skilled in the art, and exemplary encapsulation methods involve coating the selected breaker in a porous material that allows for release of the breaker at a controlled rate, or coating the chosen breakers with a material that will degrade when downhole so as to release the breaker when desired. Resins that may be useful in the present compositions include, but are not limited to, polymeric materials that will degrade when downhole.

Alternatively, the breakers may be encapsulated by synthetic and natural waxes. Waxes having different melting points may be used in order to control the delay of breaking based on the temperature of a specific subterranean operation. The encapsulation of the breaker is performed by mixing the breaker and wax above the melting temperature for the specific wax and then extruding the composition to form small particles of the encapsulated material. The resulting product may be annealed by briefly heating the product to the point of the coating to seal cracks in the coating, thus preventing premature release. The encapsulation may also be achieved by melt spraying the wax on the breaker (for example, citric acid) particles or by any other technique known by one of ordinary skill in the art. If used, a breaker should be included in the disclosed completion fluid in an amount sufficient to facilitate the desired reduction in viscosity in the weighted brine. For instance, peroxide concentrations that may be used vary from about 0.1 to about 30 gallons of peroxide per 1000 gallons of the completion fluid. Similarly, for instance, when citric acid is used as a breaker, concentrations of from 0.11 pptg to 30 pptg are appropriate.

An optional activator or retarder to can be used to, among other things, optimize the break rate provided by a breaker. Any known activator or retarder that is compatible with the selected breaker can be used in the present completion fluids. Examples of activators include, but are not limited to, acid generating materials, chelated iron, copper, cobalt, and reducing sugars. Examples of retarders include sodium thiosulfate, methanol, and diethylenetriamine. One of ordinary skill will be able to identify an activator or retarder for use with the selected breaker, and the proper concentration of such activator or retarder for a given application.

In some embodiments, the retarder or activator may be used in a range of from about 1 to about 100 pptg of carrier fluid or from about 5 to about 20 pptg.

One of ordinary skill will be able to identify an activator or retarder for use with the selected breaker, and the proper concentration of such activator or retarder for a given application.

Fluid Loss Control Additives

In some embodiments of the presently described completion fluids, additional fluid loss control additives may be combined with polymetaphosphate composition and the fluid loss control additives previously described herein. Examples of such additional fluid loss control agents include, but are not limited to, starches (such as IN-DRIL® HT Plus, commercially available from Halliburton Energy Services, Inc. of Duncan, Okla.), polylactic acid, polyglycolic acid, other aliphatic esters, silica flour, gas bubbles (energized fluid or foam), benzoic acid, soaps, resin particulates, relative permeability modifiers, and other immiscible fluids. If included, the additional fluid loss additive may be included in an amount of about 5 to about 2000 pptg of the completion fluid.

Corrosion Inhibitors

In some embodiments of the presently described completion fluids, corrosion inhibitors may be combined with the polymetaphosphate composition and fluid loss control additive. Corrosion inhibitors are mixed with the completion fluid to protect the metal components the fluid is likely to contact. It is especially useful in acid treatments to protect iron and steel components in the wellbore and treating equipment from the corrosive treating fluid.

Corrosion inhibitor activators, such as quaternary ammonium compounds, are added to activate the corrosion inhibitors components. Examples of corrosion inhibitor activators which can be utilized in accordance with the present completion fluids include, but are not limited to, copper compounds such as cuprous iodide and cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid and combinations thereof. When a corrosion inhibitor activator is included in the completion fluid, it can be present in the range of from about 0.1 wt % to about 5.0 wt % of the completion fluid.

Because of the polymetaphosphate composition and fluid loss control additive's ability to be combined with a variety of known oil and gas completion fluid additives without adverse effects to the polymetaphosphate composition and fluid loss control additive's physical blocking abilities, the polymetaphosphate composition and fluid loss control additive can be used in a variety of applications. Its versatility will allow the present composition to be used for many different operations, including fluid loss control, diversion, and plugging operations.

The present compositions and methods are exemplified with respect to the following description for a wellbore that penetrates a subterranean formation, and The FIGURE. However, this is exemplary only, and the compositions and methods can be broadly applied to any combination of particulate polymetaphosphate composition, a biopolymer suspension agent, a smaller fluid loss control additive, and a weighting fluid. The following is intended to be illustrative only, and not unduly limit the scope of the appended claims.

In The FIGURE, a wellbore 10 is drilled through a hydrocarbon containing formation 12. Per known methods, the wellbore 10 is completed with a casing or liner disposed therein, wherein a cement slurry is pumped into the well to displace the existing drilling fluids and fill in the space between the casing and the actual sides of the drilled well. This results in a cement sheath that surrounds the casing in the annulus between the casing and the formation 12. The cement sheath bonds the casing to the walls of the formation and prevents fluids from flowing behind the casing.

To establish a path between the wellbore and the formation 12, perforation operations are performed to create at least one perforation 14 in the wellbore. The perforation 14 can be created using known methods, such as e.g. shaped explosive charges on a perforation gun.

Once at least one perforation 14 establishes communication between the wellbore 10 and the formation 12, a high density completion fluid such as the novel completion fluid described here can be injected through wellbore 10 and pumped down the tubing 16. The particulate polymetaphosphate composition and smaller fluid loss control additive are carried through the wellbore 10 by the viscous, weighted carrier fluid. Thus, a slurry of particulate solid material flows through the perforation 14 into the formation 12.

The particulate polymetaphosphate composition bridges on the face of the formation 12 and fills the cavity or tunnel of the perforations 14. Even though the perforations 14 are bridged with the polymetaphosphate composition, liquid from the interior of the casing can continue to flow through the porosity of the particulate solid material and into the formation 12. This continued fluid loss can be reduced by the second, smaller fluid loss control material in the carrier fluid. The additional fluid loss control particulate solid material bridges on the particulate polymetaphosphate composition to form a seal over the opening of the perforations 14 within the interior of the casing. As mentioned above, the size of this additional fluid loss control particulate solid material is about a third of the size of the particulate polymetaphosphate composition.

The wellbore 10 normally contains a plurality of perforations 14, all of which are filled with the particulate polymetaphosphate composition and the second fluid loss particulate material at the same time. Once the perforations are sealed, any desired operations may be performed within the wellbore 10 such as tripping perforating guns out of the wellbore after perforating, making up and running into the wellbore a screen assembly, coming out of a wellbore with a service tool, running a completion assembly or the like.

Upon completion of the well operations, the fluid loss control materials can be removed from the wellbore 10, the perforations 14 and the formation 12, by an aqueous acidic fluid circulated down the tubing 16 and upwardly in the annulus between the tubing 18 and the casing. The aqueous acidic fluid dissolves the smaller fluid loss material within the casing. When the smaller fluid loss material is dissolved to the point where it no longer seals the perforations 14, the aqueous acidic fluid flows into the perforations 14 by way of the porosity of the particulate polymetaphosphate composition. The aqueous acidic fluid continues to flow through the perforation 14 and into the formation 12 whereby the particulate polymetaphosphate composition is also dissolved and all of the particulate solid material is removed.

Variations of the above methods can be made to address different openings. When openings in a gravel pack screen positioned within a wellbore need to be sealed, the viscous fluid can be introduced into the inside of a gravel pack screen. Similar to the above embodiment for packing a perforation, the particulate polymetaphosphate composition and second particulate material can be used to close openings. However, larger particle sizes of both particulate materials will be needed due to the larger opening in the gravel pack. Once the screen surface has been sealed, other operations can be performed in the wellbore.

Thus, the present compositions are capable of blocking and/or filling openings in formations for temporary periods of time under a variety of reservoir conditions without the risk of permanent blockage. This allows for completion operations to be performed and finish without the loss of fluids to the formation. The openings can then be quickly unplugged through the use of acidic fluids that readily dissolve fluid loss control agents in a matter of minutes without damaging the formation.

The following references are incorporated by reference in their entirety.

US20160069155

What is claimed is:

1. A method of plugging an opening in a reservoir comprising:
    a) injecting into a subterranean formation, a treatment fluid comprising:
        i) a weighted brine carrier fluid;
        ii) a biopolymer suspension agent for increasing the viscosity of said weighted brine carrier fluid;
        iii) a particulate polymetaphosphate composition, wherein the particulate polymetaphosphate composition is present in an amount ranging from 10 to 200 pounds per barrel of carrier fluid, and wherein the polymetaphosphate composition is selected from the group consisting of sodium polymetaphosphate $((NaPO_3)_6)$, sodium trimetaphosphate $((NaPO_3)_3)$, potassium polymetaphosphate $((KPO_3)_6)$, potassium trimetaphosphate $((KPO_3)_3)$, magnesium polymetaphosphate $(Mg(PO_3)_2)$ and calcium polymetaphosphate $(Ca(PO_3)_2)$; and,
        iv) a fluid loss control additive;
    b) blocking at least one opening in said subterranean formation with the particulate polymetaphosphate composition;
    c) blocking at least one gap between particles of the particulate polymetaphosphate composition or a gap between the particulate polymetaphosphate composition and said opening with the fluid loss control additive;
    d) performing one or more additional operations that uses a fluid in said subterranean formation, wherein the fluid is not lost through the blocked openings;
    e) circulating an aqueous acidic fluid through said wellbore to remove the particulate polymetaphosphate composition and the fluid loss control additive; and,
    f) flowing fluids through the unblocked opening.

2. The method of claim 1, wherein said opening is in a gravel pack screen.

3. The method of claim 1, wherein said opening is in a vug, a pore space, or fracture.

4. The method of claim 1 wherein said particulate polymetaphosphate composition has a particle size between about 1 to about 1200 microns.

5. The method of claim 1, wherein said weighted brine carrier fluid comprises an aqueous fluid and a salt selected from the group consisting of calcium chloride, calcium bromide, zinc bromide, sodium chloride, sodium bromide, potassium chloride, ammonium chloride, cesium formate, or combinations thereof.

6. The method of claim 1, wherein said biopolymer suspension agent is xanthan, cellulose derivatives, guar derivatives, diutan, or combinations thereof.

7. The method of claim 1, wherein said fluid loss control additive is selected from a group comprising starch, ground guar, wax, oil soluble resin or combinations thereof.

* * * * *